United States Patent [19]

DiGiovacchino et al.

[11] Patent Number: 4,800,096

[45] Date of Patent: Jan. 24, 1989

[54] PECTIN GELLING COMPOSITION

[75] Inventors: David J. DiGiovacchino, Hightstown; Richard A. Carlson, Freehold; Rodger H. Jonas, Cranbury; Sheila Marion, Lakewood, all of N.J.

[73] Assignee: General Foods Corporation, White Plains, N.Y.

[21] Appl. No.: 56,619

[22] Filed: May 29, 1987

[51] Int. Cl.⁴ .............................................. A23L 1/06
[52] U.S. Cl. ..................................... 426/577; 426/453; 426/96; 426/291; 426/294
[58] Field of Search ............... 426/577, 453, 291, 576, 426/96, 294

[56] References Cited

U.S. PATENT DOCUMENTS

| | | | |
|---|---|---|---|
| 1,629,716 | 5/1927 | Leo | 426/577 |
| 1,842,768 | 1/1932 | Rooker | 426/577 |
| 1,997,615 | 4/1935 | Wallerstein et al. | 426/577 |
| 2,703,757 | 3/1955 | Leo et al. | 426/577 |
| 2,856,288 | 10/1958 | Peebles | 426/577 |
| 3,041,179 | 6/1962 | Lister | 426/577 |
| 3,133,053 | 5/1964 | Bender | 426/577 |
| 3,595,676 | 7/1971 | Langen et al. | |
| 4,571,346 | 2/1986 | Lehmann | 426/453 |
| 4,686,106 | 8/1987 | Ehrlich et al. | 426/577 |

*Primary Examiner*—Jeanette Hunter
*Attorney, Agent, or Firm*—T. R. Savoie; D. J. Donovan

[57] ABSTRACT

A one-step pectin gelling composition is produced by combining sugar, acid and pectin, the pectin having a D.M. of from 70 to 75 and a particle size of less than 200 microns.

7 Claims, No Drawings

PECTIN GELLING COMPOSITION

TECHNICAL FIELD

The present invention relates to a dry pectin gelling composition suitable for making jelly and jams utilizing a one-step process and to a process for preparing the dry pectin gelling composition.

Commercially-available, dry pectin products consisting of a dry-blended mix of sugar, pectin and a food acid have been utilized for the home preparation of jellies and jams. The recipe for these products requires that the dry mix, usually together with a small amount of added sugar, be dissolved in fruit juice or fruit pulp which is then brought to a boil. Thereafter additional sugar is added and dissolved in the boiling mix. This two-step recipe is necessitated by the fact that if all of the sugar were added to the fruit juice or fruit pulp along with the pectin, the sugar quickly raises the solids content of the aqueous solution (i.e. juice or liquid phase of the pulp) above the maximum concentration at which the pectin can be dissolved.

BACKGROUND ART

The art has recognized that it would be desirable to produce a one-step, dry pectin gelling composition in order to facilitate the production of jellies, jams and the like. One-step liquid gelling agents wherein pectin is present in dissolved form are known, but these gelling agents require chemical preservation and/or sterilization and also the addition of sugar in measured amount at the time of preparing the jelly or jam.

U.S. Pat. No. 3,595,676 to Langen et al. discloses a one-step, dry, pectin-containing gelling composition which contains all of the ingredients (i.e. pectin, food acid, sugar) which have to be added to the fruit juice or fruit pulp. The product described in this patent consists (in unflavored form) predominantely of sugar (e.g. 98% by weight), about 1% by weight of pectin and about 0.8% by weight of an acid wherein granules of coarsely ground sugar are coated with particles of finely subdivided pectin, sugar and/or acid (i.e., fruit acid such as citric or tartaric). The product also discloses that the sugar granules may be moistened, such as by contact with steam, in order to promote adhesion of the finely-ground particles onto the sugar granules. This patent however requires the use of pectin which has a medium or low degree of esterification (i.e., between 60 and 38) and avoids the use of conventional and more economical highly-esterified pectins. The patent in one embodiment directs the use of sugar granules of a size from 0.3 to 2 mm (about 50 U.S. mesh to 10 U.S. mesh) in combination with co-ground particles of pectin and fruit acid having a particle size between about 2 microns and 50 microns (270 U.S. mesh). Co-grinding is a process which usually requires the use of relatively sophisticated grinding equipment and/or grinding procedures.

U.S. Pat. No. 4,686,106 to Ehrlich discloses another one-step, dry pectin gelling composition wherein an emulsifier is coated onto coarse, sanding sugar and this coated sugar is then mixed with finely ground pectin (less than 200 mesh, preferably less than 400 mesh) and citric acid. This product requires the presence of a chemical emulsifier which may not be viewed as desirable in such foods as homemade jellies and jams.

DISCLOSURE OF THE INVENTION

A dry, pectin gelling composition for use in preparing home-made jellies and jams via a single step addition to fruit juice or fruit pulp is made using a high methoxy (DM of 70 to 75) pectin and an absence of any added emulsifier. The term "DM" signifies the degree of methoxylation as is common in the pectin art.

According to this invention pectin having a DM in the range of 70 to 75 is ground to a particle size wherein essentially all of the particles will pass thru 200 mesh U.S. Standard Sieve (74 microns). These pectin particles are combined with particles of a food acid such as fumaric, citric, tartaric, adipic or combinations thereof. The acid particles will preferably have an average particle size of from about 150 to 300 microns, (about 100 to 50 U.S. mesh) more preferably from 210 to 250 microns (60 to 70 U.S. mesh).

The sugar component of the gelling composition, which constitutes the vast majority of composition, typically in excess of 96% by weight of the product, must be relatively coarse in size, having an average particle size of at least 150 microns, more preferably at least 210 microns.

Blending of the pectin, acid and sugar components of the composition may be done in standard mixing equipment such as a ribbon blender. No co-grinding step is utilized. When dry-blending methodology is utilized the pectin particles should be sized such that in excess of 90% by weight of the particles are retained on a 400 mesh U.S. Standard Sieve (37 microns).

The pectin gelling compositions produced according to this invention will, in unflavored form, consist essentially of sugars, pectin and acids with the pectin level ranging from 0.4 to 2.0% by weight and the acid level being from 0.1 to 0.7% by weight.

Alternatively, in lieu of dry-blending, it has been found that pectin particles of less than 200 U.S. mesh size may be adhered to the surface of sugar particles wherein at least 90% by weight of the sugar exceeds 16 U.S. mesh (1190 microns) and at least 35%, by weight exceeds 12 U.S. mesh (1680 microns) in order to produce an effective one-step, dry pectin gelling composition. Preferably at least 90% by weight of the sugar will exceed 20 U.S. mesh (840 microns) and about 50 to 70% by weight of the pectin will be less than 400 U.S. mesh (37 microns). For this embodument it has been found that the larger the size of the sugar particles the better will be the functionality of the pectin.

A method for adhering the pectin particles to the sugar is to spray a small amount of water, typically from 0.3 to 2%, preferably from about 0.6 to 1%, by weight of the sugar, onto the sugar Particles and to thereafter mix the pectin particles with the moistened sugar. In operation, the sugar may be added to a mixer and the water spray applied while the sugar is being mixed. Mixing is continued and the pectin particles are then added. The acid may be added in dry form with the pectin in which event acid particles will also be adhered to the surface of the sugar particles. Alternatively, the acid can be predissolved in the water which is sprayed onto the sugar particles. It is desirable to use distilled water for the water spray or water-acid spray in order to eliminate any interaction between the ions contained in normal tap water and the pectin.

The agglomerated coarse sugar-fine pectin material described above will enable the use of a significantly lower pectin level versus the previously described dry blend of fine pectin, acid and sugar. This is due to the use of larger sugar particles and smaller pectin Particles so that the pectin dissolves at a faster rate while the concentration of dissolved sugar solids is retarded. A pectin gelling composition contaning finely ground pectin adhered to the surface of coarse sugar particles will contain in excess of 99% by weight of sugar and less than 1% by weight of pectin. A pectin level of from 0.4 to 0.75% by weight may be utilized.

This invention is further described by the following Examples.

EXAMPLE 1

A dry blended pectin gelling composition was prepared by combining on a weight basis:

| | |
|---|---|
| Sugar (average particle size 60 U.S. mesh) | 98.10% |
| Fumaric Acid (average particle size 60-70 U.S. mesh) | 0.21% |
| Pectin (DM of 72; 100% minus 200 U.S. mesh, 100% on 400 U.S. mesh) | 1.69% |

Two pounds of this mixture were used to prepare a jelly by stirring the blend into 3 cups of grape juice and one cup of water which has been brought to a 4-minute boil. Upon cooling and setting, a good quality grape jelly was produced.

EXAMPLE 2

An agglomerated sugar-pectin gelling composition was prepared by adding the sugar component to a mixer and, while mixing, spraying 0.75% of distilled water onto the sugar. Mixing was continued for three minutes at which point dry pectin and dry acid were added. Mixing was continued for seven additional minutes. The resulting product was as follows (weight basis):

| | |
|---|---|
| Sugar (90%, +16 mesh; 35%, +12 mesh) | 99.29% |
| Pectin (DM of 72; 100% minus 200 U.S. mesh, more than 50% minus 400 U.S. mesh) | 0.50% |
| Fumaric Acid (average particle size 60-70 U.S. mesh) | 0.21% |

Two pounds of this mixture was added to 3.25 cups of clean, crushed strawberries and brought to a four minute boil. Upon cooling about 44 ounces of strawberry jam of good quality was obtained.

Having thus described the invention what is claimed is:

1. A dry pectin gelling composition suitable for making jelly and jams utilizing a one-step process, said gelling composition, in unfavored form, consisting essentially of at least 96% by weight sugar, from 0.1 to 0.7% food acid and from 0.5 to 2.0% pectin having a DM of from 70 to 75, wherein the pectin gelling composition is produced by combining sugar particles and pectin particles, wherein the sugar particles have an average particle size in excess of 210 microns, wherein essentially all of the pectin particles will pass through a 200 mesh U.S. Standard Sieve and wherein said pectin particles are adhered to the surface of said sugar particles.

2. The dry pectin gelling composition of claim 1 wherein sugar, pectin and food acid particles are combined by agglomeration and at least 90% by weight of the sugar particles exceed 20 U.S. mesh, about 50 to 70% by weight of the pectin particles are less than 400 U.S. mesh and the food acid particles have an average particle size of from about 150 to 300 microns.

3. The dry pectin gelling composition of claim 2 which is agglomerated by spraying water onto the surface of the sugar particles at a level of 0.3 to 2% by weight of the sugar and then mixing the sugar with the pectin and food acid particles.

4. The dry pectin gelling composition of claim 3 wherein the composition contains in excess of 99% by weight of sugar.

5. The dry pectin gelling composition of claim 4 wherein the pectin level is from 0.4 to 0.75% by weight.

6. The dry pectin gelling composition of claim 5 wherein the acid particles have a particle size of from 210 to 250 microns.

7. The dry pectin gelling composition of claim 6 wherein the level of water sprayed onto the sugar is from about 0.6 to 1% by weight of the sugar and wherein the water is distilled water.

* * * * *